(12) United States Patent
Fang et al.

(10) Patent No.: US 11,567,358 B2
(45) Date of Patent: Jan. 31, 2023

(54) COLOR FILM SUBSTRATE AND MANUFACTURING METHOD THEREOF, AND DISPLAY PANEL

(71) Applicants: Fuzhou BOE Optoelectronics Technology Co., Ltd., Fujian (CN); BOE Technology Group Co., Ltd., Beijing (CN)

(72) Inventors: Xin Fang, Beijing (CN); Jixiang Chen, Beijing (CN); Shanshan Xu, Beijing (CN); Longgan Hu, Beijing (CN); Wenchao Wang, Beijing (CN); Jinliang Wang, Beijing (CN); Sang Jin Park, Beijing (CN)

(73) Assignees: FUZHOU BOE OPTOELECTRONICS TECHNOLOGY CO., LTD., Fujian (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/355,511

(22) Filed: Jun. 23, 2021

(65) Prior Publication Data

US 2022/0137451 A1 May 5, 2022

(30) Foreign Application Priority Data

Oct. 29, 2020 (CN) .......................... 202011182459.X (51) Int. Cl.
*G02F 1/1335* (2006.01)
(52) U.S. Cl.
CPC .. *G02F 1/133512* (2013.01); *G02F 1/133514* (2013.01); *G02F 1/133516* (2013.01)
(58) Field of Classification Search
None
See application file for complete search history.

(56) References Cited

U.S. PATENT DOCUMENTS

2010/0165272 A1 7/2010 Li et al.
2016/0077376 A1* 3/2016 Lee .................. G02F 1/133512
349/110

(Continued)

FOREIGN PATENT DOCUMENTS

CN 104865741 A * 8/2015 ....... G02F 1/133512
CN 106324901 A * 1/2017 ....... G02F 1/133514

(Continued)

OTHER PUBLICATIONS

First Office Action dated Mar. 14, 2022 for application No. CN202011182459.X with English translation attached.

*Primary Examiner* — Shan Liu
(74) *Attorney, Agent, or Firm* — Nath, Goldberg & Meyer; Joshua B. Goldberg (57) ABSTRACT

Provided are a color film substrate and manufacturing method thereof, and a display panel and manufacturing method thereof. The color film substrate is divided into a display region, and a non-display region around a periphery of the display region and including an edge region at an edge of the color film substrate. The color film substrate includes base, color resist layer on the base and black matrix layer on the base at least in the display region. In the edge region, the color resist layer includes first sub color resist layer on the base and second sub color resist layer on the first sub color resist layer, the first sub color resist layer allows light in first wavelength range to transmit therethrough, the second sub color resist layer allows light in a second wavelength range to transmit therethrough, and the first wavelength range does not overlap the second wavelength range.

15 Claims, 3 Drawing Sheets

(56) References Cited

U.S. PATENT DOCUMENTS

2016/0144394 A1* 5/2016 Zheng ................... G02F 1/1303
                                                       118/200
2017/0139263 A1* 5/2017 Jin ...................... G02F 1/13452

FOREIGN PATENT DOCUMENTS

| CN | 106324901 A |   | 1/2017 |           |
|----|-------------|---|--------|-----------|
| CN | 106371242 A |   | 2/2017 |           |
| CN | 106842687 A | * | 6/2017 | G02F 1/1333 |
| CN | 108363233 A | * | 8/2018 |           |
| CN | 108363233 A |   | 8/2018 |           |

* cited by examiner

COLOR FILM SUBSTRATE AND MANUFACTURING METHOD THEREOF, AND DISPLAY PANEL

CROSS REFERENCE TO RELATED APPLICATIONS

The present application claims priority to a Chinese patent application No. 202011182459.X, filed on Oct. 29, 2020 to National Intellectual Property Administration, PRC, the present disclosure of which is incorporated herein by reference in its entirety.

TECHNICAL FIELD

The present disclosure belongs to the field of display technologies, and particularly to a color film substrate, a manufacturing method thereof and a display panel.

BACKGROUND

A liquid crystal display panel is generally manufactured by arranging a color film substrate to be opposite to and aligned with a liquid crystal array substrate, and a target liquid crystal display panel of a target size is obtained by cutting the liquid crystal display panel. The color film substrate generally includes a black matrix (BM) for blocking light. Since the black matrix includes carbon particles having conductive capability, the black matrix is not generally formed at an edge region of the color film substrate in order to prevent static electricity produced in the cutting of the liquid crystal display panel from being transmitted to an inside of the liquid crystal display panel through the black matrix and thus affecting the inside of the liquid crystal display panel. Generally, a distance for a cutting tolerance is reserved between the black matrix and an edge of the color film substrate, which results in that a region without coverage of the black matrix at the edge of the liquid crystal display pane is light-transmitting. For a bezel-less liquid crystal display panel, user experience will be greatly influenced by a screen white edge (namely an edge bright line), a metal bright edge and the like caused by light leakage at the edge of the liquid crystal display panel. The metal bright edge refers to a phenomenon that light irradiated to a metal line extending from a display region of an array substrate to a region without coverage of the black matrix at the edge of the liquid crystal display panel is reflected by the metal line, and the reflected light emitted from the region without coverage of the black matrix at the edge of the liquid crystal display panel presents the metal bright edge.

SUMMARY

One aspect of the present disclosure discloses a color film substrate which is divided into a display region and a non-display region disposed around a periphery of the display region, the non-display region includes an edge region located at an edge of the color film substrate, and the color film substrate includes: a base, a color resist layer disposed on the base and a black matrix layer disposed on the base and at least located in the display region. In the edge region, the color resist layer comprises a first sub color resist layer disposed on the base and a second sub color resist layer disposed on the first sub color resist layer, the first sub color resist layer allows light in a first wavelength range to transmit therethrough, the second sub color resist layer allows light in a second wavelength range to transmit therethrough, and the first wavelength range does not overlap with the second wavelength range.

According to an embodiment of the present disclosure, the black matrix layer is not located in the edge region.

According to an embodiment of the present disclosure, the black matrix layer is located in the display region and the edge region, and the black matrix layer in the edge region includes a plurality of black matrix blocks separated from each other.

According to an embodiment of the present disclosure, the plurality of black matrix blocks is arranged on the base in the edge region in a mosaic pattern.

According to an embodiment of the present disclosure, the color resist layer completely fills a gap between any two black matrix blocks of the plurality of black matrix blocks.

According to an embodiment of the present disclosure, an orthographic projection of the plurality of black matrix blocks on the base is located within an orthographic projection of the color resist layer on the base.

According to an embodiment of the present disclosure, a part of an orthogonal projection of each of the plurality of black matrix blocks on the base overlaps with the orthogonal projection of the color resist layer on the base.

According to an embodiment of the present disclosure, an orthographic projection of the first color resist layer on the base completely overlaps with an orthographic projection of the second color resist layer on the base.

According to an embodiment of the present disclosure, a width of the edge region in a direction parallel to the base ranges from 180 μm to 300 μm, and an interval between any two black matrix blocks of the plurality of black matrix blocks ranges from 10 μm to 15 μm.

According to an embodiment of the present disclosure, the color film substrate further includes a planarization layer located in the display region and the edge region and disposed on the color resist layer and the black matrix layer.

According to an embodiment of the present disclosure, the non-display region further includes a spacing region located between the display region and the edge region to space the display region apart from the edge region, the color resist layer is not located in the spacing region, and the black matrix layer is located at least in the display region and the spacing region.

Another aspect of the present disclosure provides a liquid crystal display panel, which includes the color film substrate as described above, a liquid crystal layer disposed on the base of the color film substrate, and a backlight layer disposed on a side of the liquid crystal layer facing away from the color film substrate.

Another aspect of the present disclosure provides a manufacturing method of a color film substrate, the manufacturing method including steps of: providing a base divided into a display region and a non-display region disposed around a periphery of the display region, the non-display region including an edge region located at an edge of the base; forming a black matrix layer on the base at least in the display region through a first process; forming a first sub color resist layer on the base in the display region and the edge region through a second process; forming a second sub color resist layer in the display region and the edge region through a third process; and forming a third sub color resist layer in the display region through a fourth process. In the edge region, the second sub color resist layer is formed on the first sub color resist layer, the first sub color resist layer allows light of a first wavelength range to pass therethrough, the second sub color resist layer allows light of a second wavelength range to pass therethrough, the third sub color resist layer allows light of a third wavelength range to pass therethrough, and the first wavelength range, the second wavelength range, and the third wavelength range do not overlap with each other.

According to an embodiment of the present disclosure, the black matrix layer is not formed on the base in the edge region.

According to an embodiment of the present disclosure, the step of forming the black matrix layer on the base at least in the display region through the first process includes forming the black matrix layer on the base in the display region and the edge region, and the black matrix layer in the edge region includes a plurality of black matrix blocks separated from each other.

According to an embodiment of the present disclosure, the plurality of black matrix blocks is formed on the base in the edge region in a mosaic pattern.

According to an embodiment of the present disclosure, the first sub color resist layer in the edge region completely fills a gap between any two black matrix blocks of the plurality of black matrix blocks.

According to an embodiment of the present disclosure, an orthogonal projection of the first sub color resist layer in the edge region on the base completely overlaps with an orthogonal projection of the second sub color resist layer in the edge region on the base.

According to an embodiment of the present disclosure, the non-display region further includes a spacing region located between the display region and the edge region to space the display region apart from the edge region, the first sub color resist layer, the second sub color resist layer, and the third sub color resist layer are not formed on the base in the spacing region, and the black matrix layer is formed on the base in at least the display region and the spacing region.

Another aspect of the present disclosure provides a manufacturing method of a liquid crystal display panel, the method including: manufacturing a color film substrate according to the above described manufacturing method of the color film substrate; forming a liquid crystal layer on the base of the color film substrate; and forming a backlight layer on a side of the liquid crystal layer facing away from the color film substrate.

DETAILED DESCRIPTION

In order to make those skilled in the art better understand the technical solution of the present disclosure, a color film substrate, a manufacturing method thereof, and a display panel will be described in further detail below with reference to the accompanying drawings and the detailed description.

In order to solve a problem of a screen white edge and/or a metal bright edge caused by light emitted by a backlight layer in a bezel-less liquid crystal display panel leaking through an edge of a color film substrate above the backlight layer, black matrix (BM) blocks distributed discontinuously, such as black matrix blocks distributed in a mosaic shape, are usually formed in an edge region of the color film substrate, so that static electricity (ESD) produced when cutting the liquid crystal display panel cannot be transmitted to an inside of the liquid crystal display panel through the discontinuous black matrix blocks, and the problem of the screen white edge caused by light leakage at the edge of the bezel-less liquid crystal display panel and the metal bright line caused by a metal film layer at an edge of an array substrate (including a liquid crystal layer and the backlight layer) can be greatly improved. However, although the mosaic-shaped black matrix blocks can improve a problem of light leakage at the edge of the bezel-less liquid crystal display panel, there are gaps between the mosaic-shaped black matrix blocks and thus a part of light may leak through the gaps. That is, the problem of light leakage at the edge of the bezel-less liquid crystal display panel cannot be completely solved by arranging the mosaic-shaped black matrix blocks at the edge of the color film substrate.

Figure 1:
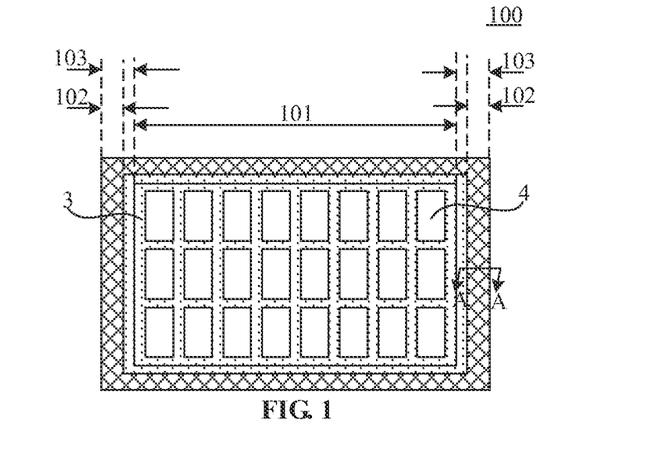
FIG. 1 is a structural schematic top view of a color film substrate according to an embodiment of the present disclosure.
Figure 2:
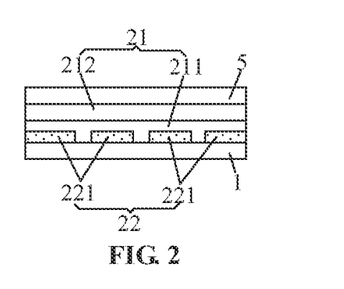
FIG. 2 is a structural schematic cross-sectional view of an edge region of the color film substrate in FIG. 1 along a section line A-A.

FIG. 1 is a structural schematic top view of a color film substrate according to an embodiment of the present disclosure, and FIG. 2 is a structural schematic cross-sectional view of an edge region of the color film substrate in FIG. 1 along a section line A-A.

As shown in FIG. 1 and FIG. 2, a color film substrate 100 includes a display region 101 and a non-display region 103 disposed around a periphery of the display region 101, where the non-display region 103 includes an edge region 102, and the edge region 102 is located at an edge of the color film substrate 100. The color film substrate 100 includes a base 1, a color resist layer 21 disposed on the base 1, and a black matrix layer 22 disposed on the base 1 and at least located in the display region 101. In the edge region 102, the color resist layer 21 includes a first sub color resist layer 211 disposed on the base 1 and a second sub color resist layer 212 disposed on the color resist layer 211, the first sub color resist layer 211 allows light of a first wavelength range to pass therethrough, the second sub color resist layer 212 allows light of a second wavelength range to pass therethrough, and the first wavelength range and the second wavelength range do not overlap with each other. For example, light of the first wavelength range represents red light and light of the second wavelength range represents blue light.

The display region 101 indicates a region of the color film substrate 100 corresponding to a region for display in a liquid crystal display panel formed by arranging the color film substrate 100 to be opposite to and aligned with and an array substrate (including a liquid crystal layer and a backlight layer). The non-display region 103 indicates a region of the color film substrate 100 corresponding to a region not used for display in the liquid crystal display panel formed by arranging the color film substrate 100 to be opposite to and aligned with the array substrate. The edge region 102 is located at an outer region of the non-display region 103 facing away from the display region 101, and refers to a region reserved for cutting the liquid crystal display panel. The non-display region 103 further includes a spacing region in addition to the edge region 102, the spacing region is located between the display region 101 and the edge region 102 to space the display region 101 apart from the edge region 102, and indicates a region of the color film substrate 100 corresponding to wirings in the liquid crystal display panel formed by arranging the color film substrate 100 to be opposite to and aligned with the array substrate. A bezel-less liquid crystal display panel is generally formed by cutting a mother substrate formed by arranging a color film substrate to be opposite to and aligned with an array substrate after the color film substrate and the array substrate are respectively manufactured, and in order to meet a requirement for a cutting tolerance, the edge region 102 with a certain width is generally disposed. In a typical bezel-less liquid crystal display panel, the existence of the edge region may cause light emitted from the backlight layer in the array substrate, passed through the liquid crystal layer and irradiated on the edge region to leak through the edge region or through gaps between black matrix blocks included in the edge region, so that a screen white edge and/or a metal bright line appear on the liquid crystal display panel during display.

In the color film substrate 100 according to an embodiment of the present disclosure, the color resist layer 21 is disposed in the edge region 102, so that when the color film substrate 100 is used for manufacturing the liquid crystal display panel, light emitted by the backlight layer in the liquid crystal display panel is blocked by the color resist layer 21 when the light penetrates through the liquid crystal layer and irradiates the edge region 102, thereby eliminating a phenomenon of a screen white edge and/or a metal bright line caused by light leakage of the edge region 102, and improving user experience.

According to an embodiment of the present disclosure, in the display region 101, the color resist layer 21 includes a plurality of color resist blocks 4 arranged in an array, and the black matrix layer 22 is disposed between any two adjacent color resist blocks of the plurality of color resist blocks 4. A color (i.e., a wavelength range of light allowed to pass therethrough) of each of the plurality of color resist blocks 4 corresponds to a color of a sub-pixel in the liquid crystal display panel to be formed. After the color film substrate 100 and the array substrate are opposite to and aligned with each other to form the liquid crystal display panel, the plurality of color resist blocks 4 in the display region 101 of the color film substrate 100 and a structure in the array substrate form a plurality of sub-pixels of different colors, for example, red, green, and blue sub-pixels. The black matrix layer 21 in the display region 101 of the color film substrate 100 can prevent color mixing between the sub-pixels of different colors, thereby realizing and improving color display of the liquid crystal display panel. As shown in FIG. 1 and FIG. 2, the black matrix layer 22 is disposed in the display region 101 and the edge region 102, and the black matrix layer 22 in the edge region 102 includes a plurality of black matrix blocks 221 separated from each other. For example, a plurality of black matrix blocks 221 may be disposed on the base 1 in the edge region 102 in a mosaic pattern. In the edge region 102, the first sub color resist layer 211 completely covers the plurality of black matrix blocks 221, that is, an orthographic projection of the plurality of black matrix blocks 221 on the base 1 is located within an orthographic projection of the first sub color resist layer 211 on the base 1. The second sub color resist layer 212 is located on the first sub color resist layer 211, and the orthogonal projection of the first sub color resist layer 211 on the base 1 completely overlaps with an orthogonal projection of the second sub color resist layer 212 on the base 1.

According to an embodiment of the present disclosure, the color resist layer 21 is not disposed on the base 1 in the spacing region, and the black matrix layer 22 is disposed on the base 1 in the spacing region. In the spacing region, the black matrix layer 22 completely covers the base 1.

Figure 3:
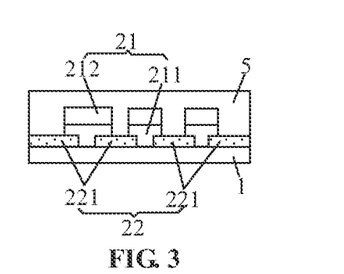
FIG. 3 is a structural schematic cross-sectional view of an edge region of the color film substrate in FIG. 1 along a section line A-A.

FIG. 3 is a schematic cross-sectional view of the edge region of the color film substrate in FIG. 1 along a section line A-A.

As shown in FIG. 3, in the edge region 102, the first sub color resist layer 211 only covers only gaps between the plurality of black matrix blocks 221, that is, the orthogonal projection of the first sub color resist layer 211 on the base 1 overlaps a portion of an orthogonal projection of each of the plurality of black matrix blocks 221 on the base 1. The second sub color resist layer 212 is located on the first sub color resist layer 211, and the orthogonal projection of the first sub color resist layer 211 on the base 1 completely overlaps with the orthogonal projection of the second sub color resist layer 212 on the base 1.

Figure 4:
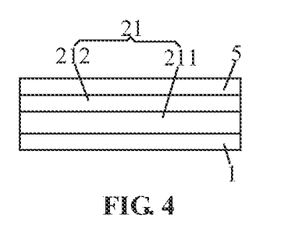
FIG. 4 is a structural schematic cross-sectional view of an edge region of the color film substrate in FIG. 1 along a section line A-A.

FIG. 4 is a schematic cross-sectional view of the edge region of the color film substrate in FIG. 1 along a section line A-A.

As shown in FIG. 4, in the edge region 102, the black matrix layer 22 is not disposed on the base 1, and the color resist layer 21 is disposed directly on the base 1.

According to an embodiment of the present disclosure, the color resist layer 21 in the edge region 102 and the color resist layer 21 in the display region 101 may be formed simultaneously of the same material in a first process, and the black matrix layer 22 in the edge region 102 and the black matrix layer 22 in the display 101 may also be formed simultaneously of the same material in a second process different from the first process, so that a manufacturing process of the color film substrate 100 is simplified. Since the material of the color resist layer 21 does not include conductive particles, even if the color resist layer 21 is disposed in the edge region 102, static electricity produced when cutting the liquid crystal display panel formed by arranging the color film substrate 100 to be opposite to and aligned with the array substrate cannot be transmitted to the display region 101 through the color resist layer 21. In addition, since the first wavelength range of the light allowed to pass through the first sub color resist layer 211 in the edge region 102 does not overlap the second wavelength range of the light allowed to pass through the second sub color resist layer 212 in the edge region 120, that is, the remaining of the light emitted from the backlight layer of the liquid crystal display panel (or, the light passing through the gaps between the black matrix blocks 221) after being filtered by the first sub color resist layer 211 cannot pass through the second sub color resist layer 212, the light emitted from the backlight layer cannot pass through the color resist layer 21 in the edge region 102, so that the color resist layer 21 plays a role of blocking light, and further improves or even completely eliminates the phenomenon of the screen white edge and/or the metal bright line caused by the light leakage from the edge region of the bezel-less liquid crystal display panel.

However, the arrangement in which the color resist layer 21 includes two sub color resist layers of different colors is merely an example, and the present disclosure is not limited thereto. In order to obtain a better light blocking effect, three or more sub color resist layers may be disposed, and wavelength ranges of light allowed to pass through any two adjacent sub color resist layers among the three or more sub color resist layers are different from each other. The more the number of the stacked sub color resist layers is, the less the light is transmitted, and the better the blocking effect is.

According to an embodiment of the present disclosure, each black matrix block 221 may have an arbitrary shape.

According to an embodiment of the present disclosure, an interval distance between two adjacent black matrix blocks 221 ranges from 10 μm to 15 μm. This distance range ensures that static electricity produced by the cutting does not electrically connect the adjacent black matrix blocks 221, thereby preventing static electricity from being transmitted to the display region 101.

According to an embodiment of the present disclosure, the color resist layer 21 may be formed by a combination of stacked red and green sub color resist layers, a combination of stacked red, blue and green sub color resist layers, a combination of stacked blue, red, green and blue sub color resist layers, and the like.

According to an embodiment of the present disclosure, a width of the edge region 102 in a direction parallel to the base 1 ranges from 180 μm to 300 μm. The width range is a minimum width of the edge region 102 provided on the color film substrate 100 when the requirement for the cutting tolerance is satisfied. The zero bezel of the display panels can be substantially realized with this width range.

Referring to FIG. 2 to FIG. 4, the color film substrate 100 further includes a planarization layer 5 which extends from the display region 101 to the edge region 102. The planarization layer 5 is disposed on a side of the color resist layer 21 and the black matrix layer 22 facing away from the base 1. The planarization layer 5 may provide a planar surface after the color film substrate 100 is arranged opposite to and aligned with the array substrate.

According to an embodiment of the present disclosure, the color film substrate 100 further includes a supporting spacer (not shown). The supporting spacer is used for supporting the array substrate and color film substrate arranged opposite to and aligned with each other.

Figure 5:
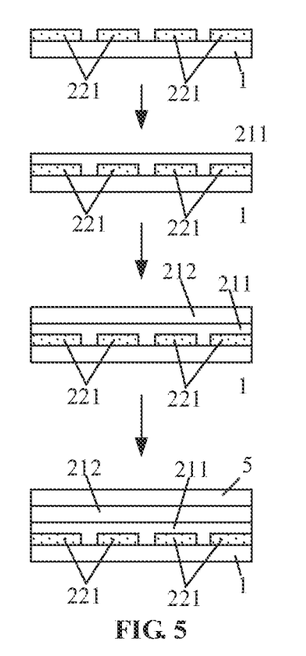
FIG. 5 is a schematic view illustrating a manufacturing process of a color film substrate according to an embodiment of the present disclosure.
Figure 6:
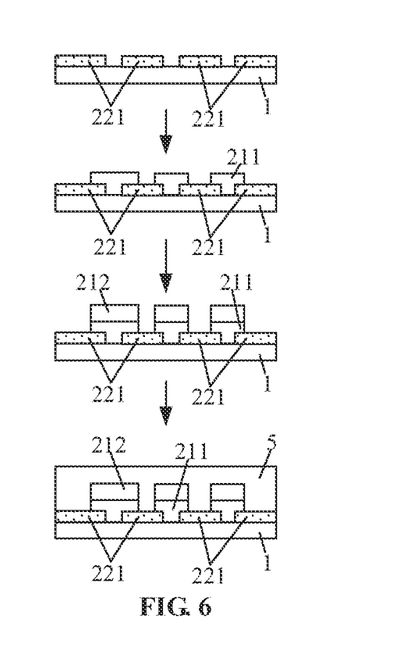
FIG. 6 is a schematic view illustrating a manufacturing process of a color film substrate according to another embodiment of the present disclosure.
Figure 7:
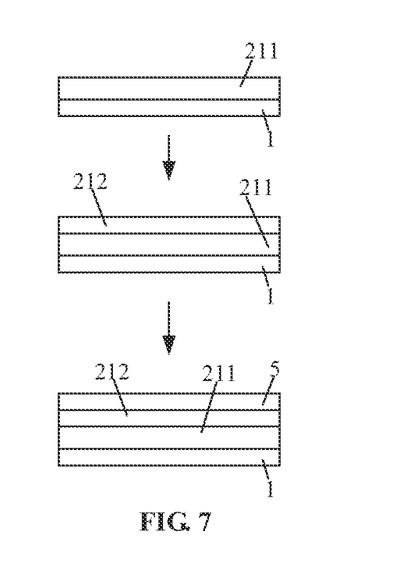
FIG. 7 is a schematic view illustrating a manufacturing process of a color film substrate according to another embodiment of the present disclosure.

FIGS. 5 to 7 are schematic views illustrating a manufacturing process of a color film substrate according to an embodiment of the present disclosure. FIG. 5 to 7 show only cross-sectional views of the edge region of the color film substrate.

FIG. 5 shows a part of the manufacturing process of the color film substrate 100 including the edge region having the cross section shown in FIG. 2, FIG. 6 shows a part of the manufacturing process of the color film substrate 100 including the edge region having the cross section shown in FIG. 3, and FIG. 7 shows a part of the manufacturing process of the color film substrate 100 including the edge region having the cross section shown in FIG. 4.

Referring to FIGS. 1 to 7, a method for manufacturing a color film substrate according to the present disclosure includes the following steps 1 to 5. In step 1, a base 1 is provided, the base 1 is divided into a display region 101 and a non-display region 103 disposed around a periphery of the display region 101, and the non-display region 103 includes an edge region 102 located at an edge of the base 1.

In step 2, a black matrix layer 22 is formed on at least the base 1 in the display region 101 through a first process. According to an embodiment of the present disclosure, the black matrix layer 22 may be formed on the base 1 in the display region 101 and the edge region 102, or the black matrix layer 22 may not be formed on the base 1 in the edge region 102. FIGS. 5 and 6 illustrate examples in which the black matrix layer 22 (i.e., a plurality of black matrix blocks 221) is formed on the base 1 in the edge region 102, and FIG. 7 illustrates an example in which the black matrix layer 22 is not formed on the base 1 in the edge region 102.

According to an embodiment of the present disclosure, the first process may be a patterning process using a first mask pattern in which a pattern corresponding to the display region 101 is different from a pattern corresponding to the edge region 102.

In step 3, a first sub color resist layer 211 is formed on the base 1 in the display region 101 and the edge region 102 through a second process. According to an embodiment of the present disclosure, the second process may be a patterning process using a second mask pattern in which a pattern corresponding to the display region 101 is different from a pattern corresponding to the edge region 102. For example, in step 3, a red sub color resist layer may be formed on the base 1 in the display region 101 and the edge region 102.

In step 4, a second sub color resist layer 212 is formed in the display region 101 and the edge region 102 through a third process. According to an embodiment of the present disclosure, the third process may be a patterning process using a third mask pattern in which a pattern corresponding to the display region 101 is different from a pattern corresponding to the edge region 102. For example, in step 3, a blue sub color resist layer may be formed on the base 1 in the display region 101 and the edge region 102.

In step 5, a third sub color resist layer (not shown) is formed in the display region 101 through a fourth process. According to an embodiment of the present disclosure, the fourth process may be a patterning process using a fourth mask pattern having only a pattern corresponding to the display region 101. For example, in step 5, a green sub color resist layer may be formed on the base 1 in the display region 101.

According to an embodiment of the present disclosure, an order of the above steps 2 to 5 is merely an example, and the above steps 2 to 5 may be performed in any order according to the present disclosure.

According to an embodiment of the present disclosure, in the edge region 102, the second sub color resist layer 212 is formed on the first sub color resist layer 211, the first sub color resist layer allows light of a first wavelength range to transmit therethrough, the second sub color resist layer allows light of a second wavelength range to transmit therethrough, the third sub color resist layer allows light of a third wavelength range to transmit therethrough, and the first wavelength range, the second wavelength range, and the third wavelength range do not overlap with each other.

According to an embodiment of the present disclosure, in order to obtain a better light blocking effect in the edge region 102, in step 5, a third sub color resist layer may also be formed on the base 1 in the edge region 102.

According to an embodiment of the present disclosure, in the above step 2, the black matrix layer 22 may not be formed on the base 1 in the edge region 102, and may also be formed on the base 1 in the display region 101 and the in edge region 102. FIGS. 5 and 6 illustrate examples in which the black matrix layer 22 is formed on the base 1 in the display region 101 and the edge region 102, and FIG. 7 illustrates an example in which the black matrix layer 22 is not formed on the base 1 in the edge region 102.

According to an embodiment of the present disclosure, the black matrix layer 22 in the edge region 102 includes a plurality of black matrix blocks 221 separated from each other, and the plurality of black matrix blocks 221 may be formed on the base 1 in the edge region 102 in a mosaic pattern.

According to an embodiment of the present disclosure, the first sub color resist layer 211 in the edge region 102 completely fills the gap between any two black matrix blocks 221 of the plurality of black matrix blocks 221. An orthographic projection of the first sub color resist layer 211 in the edge region 102 on the base 1 completely overlaps with an orthographic projection of the second sub color resist layer 212 in the edge region 102 on the base 1.

According to an embodiment of the present disclosure, the first color resist layer 211 in the edge region 102 may cover only the gap between any two adjacent black matrix blocks 221, or may cover all the black matrix blocks 221. FIG. 5 illustrates an example in which the first sub color resist layer 211 covers all the black matrix blocks 221, and FIG. 6 illustrates an example in which the first sub color resist layer 211 covers only the gap between any two adjacent black matrix blocks 221.

According to an embodiment of the present disclosure, the non-display region 103 may further include a spacing region located between the display region 101 and the edge region 102, and the spacing region spaces the display region 101 apart from the edge region 102. The first sub color resist layer 211, the second sub color resist layer 212 and the third sub color resist layer are not formed on the base 1 in the spacing region, and the black matrix layer 22 may be formed on the base 1 in the spacing region.

A width range of the edge region 102 in the color film substrate formed according to the manufacturing method in a direction parallel to the base 1 is 180 µm to 300 µm. An interval range between any two black matrix blocks of the plurality of black matrix blocks 221 formed in the edge region 102 is 10 µm to 15 µm.

According to an embodiment of the present disclosure, after the first sub color resist layer 211, the second sub color resist layer 212, and the third sub color resist layer are formed, a planarization layer 5 may be formed on the first sub color resist layer 211, the second sub color resist layer 212, and the third sub color resist layer to provide a planar surface.

Based on the manufacturing method of the color film substrate according to the embodiment of the present disclosure, the color resist layer in the display region and the color resist layer in the edge region may be formed in the same process, and the black matrix layer in the display region and the black matrix layer in the edge region may also be formed in the same process under a condition that the black matrix layer is formed on the base in the edge region, so that it is possible to prevent light leakage at an edge of a bezel-less liquid crystal display panel manufactured based on the color film substrate while avoiding static electricity produced when cutting the liquid crystal display panel from being transmitted to the display region and causing adverse effects on structures in the display region, and the manufacturing process of the color film substrate can also be simplified.

An embodiment of the present disclosure further provides a liquid crystal display panel, which includes any one of the color film substrates described above, a liquid crystal layer disposed on the base of the color film substrate, and a backlight layer disposed on a side of the liquid crystal layer facing away from the color film substrate.

In the liquid display panel adopting any one of the above color film substrates, the phenomenon of a screen white edge and a metal bright line in the edge region caused by light leakage at the edge region can be eliminated, and the user experience can be improved.

An embodiment of the present disclosure further provides a manufacturing method of a liquid crystal display panel, including: preparing a color film substrate according to the above steps S1 to S5, forming a liquid crystal layer on the base of the color film substrate, and forming a backlight layer on a side of the liquid crystal layer facing away from the color film substrate It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the present disclosure, and these changes and modifications are to be considered within the scope of the present disclosure.

The invention claimed is:

1. A color film substrate, the color film substrate being divided into a display region, a non-display region around a periphery of the display region, and a spacing region between the display region and an edge region, the non-display region comprising the edge region located at an edge of the color film substrate, the color film substrate comprising:
 a base, a color resist layer on the base and in the display region and the edge region, and a black matrix layer on the base and at least in the display region and the edge region,
 wherein in the edge region, the black matrix layer comprises a plurality of black matrix blocks separated from each other, the color resist layer comprises a first sub color resist layer on the base and a second sub color resist layer on the first sub color resist layer, the first and second sub color resist layers completely cover the plurality of black matrix blocks in the edge region and all gaps among the plurality of black matrix blocks in the edge region, the first sub color resist layer allows light of a first wavelength range to transmit therethrough, the second sub color resist layer allows light of a second wavelength range to transmit therethrough, and the first wavelength range does not overlap with the second wavelength range.

2. The color film substrate according to claim 1, wherein the plurality of black matrix blocks is arranged on the base in the edge region in a mosaic pattern.

3. The color film substrate according to claim 1, wherein the color resist layer completely fills a gap between any two of the plurality of black matrix blocks.

4. The color film substrate according to claim 3, wherein an orthogonal projection of the plurality of black matrix blocks on the base is within an orthogonal projection of the color resist layer on the base.

5. The color film substrate according to claim 1, wherein an orthographic projection of the first color resist layer on the base completely overlaps with an orthographic projection of the second color resist layer on the base.

6. The color film substrate according to claim 1, wherein a width of the edge region in a direction parallel to the base ranges from 180 µm to 300 µm, and
 wherein an interval between any two black matrix blocks of the plurality of black matrix blocks ranges from 10 µm to 15 µm.

7. The color film substrate according to claim 1, further comprising a planarization layer in the display region and the edge region and on the color resist layer and the black matrix layer.

8. The color film substrate according to claim 1, wherein
wherein the color resist layer is not in the spacing region, and
wherein the black matrix layer is in the display region, the spacing region, and the edge region.

9. A liquid crystal display panel, comprising the color film substrate of claim 1, a liquid crystal layer on the base of the color film substrate, and a backlight layer on a side of the liquid crystal layer facing away from the color film substrate.

10. A manufacturing method of a color film substrate, comprising steps of:
providing a base, the base being divided into a display region, a non-display region around a periphery of the display region, and a spacing region between the display region and an edge region, the non-display region comprising the edge region at an edge of the base;
forming a black matrix layer on the base at least in the display region and the edge region through a first process;
forming a first sub color resist layer on the base in the display region and the edge region through a second process;
forming a second sub color resist layer in the display region and the edge region through a third process; and
forming a third sub color-resist layer in the display region through a fourth process,
wherein in the edge region, the black matrix layer comprises a plurality of black matrix blocks separated from each other, the second sub color resist layer is formed on the first sub color resist layer, the first and second sub color resist layers completely cover the plurality of black matrix blocks in the edge region and all gaps among the plurality of black matrix blocks in the edge region, the first sub color resist layer allows light of a first wavelength range to transmit therethrough, the second sub color resist layer allows light of a second wavelength range to transmit therethrough, the third sub color resist layer allows light of a third wavelength range to transmit therethrough, and the first wavelength range, the second wavelength range and the third wavelength range do not overlap with each other.

11. The manufacturing method according to claim 10, wherein the plurality of black matrix blocks is formed on the base in the edge region in a mosaic pattern.

12. The manufacturing method according to claim 10, wherein the first sub color resist layer in the edge region completely fills a gap between any two black matrix blocks of the plurality of black matrix blocks.

13. The manufacturing method according to claim 10, wherein an orthogonal projection of the first sub color resist layer in the edge region on the base completely overlaps with an orthogonal projection of the second sub color resist layer in the edge region on the base.

14. The manufacturing method according to claim 10,
wherein the first sub color resist layer, the second sub color resist layer, and the third sub color resist layer are not formed on the base in the spacing region, and
wherein the black matrix layer is formed on the base in the display region, the spacing region, and the edge region.

15. A manufacturing method of a liquid crystal display panel, comprising:
manufacturing a color film substrate according to the manufacturing method according to claim 10;
forming a liquid crystal layer on the base of the color film substrate; and
forming a backlight layer on a side of the liquid crystal layer facing away from the color film substrate.

* * * * *